United States Patent [19]

Marienfeld

[11] Patent Number: 5,056,960
[45] Date of Patent: Oct. 15, 1991

[54] LAYERED GEOSYSTEM AND METHOD

[75] Inventor: Mark L. Marienfeld, Greer, S.C.

[73] Assignee: Phillips Petroleum Company, Bartlesville, Okla.

[21] Appl. No.: 458,102

[22] Filed: Dec. 28, 1989

[51] Int. Cl.$^5$ .............................................. E02D 3/00
[52] U.S. Cl. ...................................... 405/270; 405/128
[58] Field of Search ................... 405/38, 50, 128, 129, 405/270, 19, 258

[56] References Cited

U.S. PATENT DOCUMENTS

| | | | |
|---|---|---|---|
| 3,870,557 | 3/1975 | Fink et al. | 117/161 R |
| 4,524,093 | 6/1985 | Devry | 427/389.9 |
| 4,624,604 | 11/1986 | Wagner et al. | 405/128 |
| 4,683,165 | 7/1987 | Lindemann et al. | 428/290 |
| 4,749,306 | 6/1988 | Demeny et al. | 405/50 X |
| 4,787,772 | 11/1988 | Wagner | 405/128 X |
| 4,797,964 | 1/1989 | Ritter et al. | 8/115.6 |
| 4,800,119 | 1/1989 | Kolar | 428/283 |
| 4,815,892 | 3/1989 | Martin | 405/128 X |

OTHER PUBLICATIONS

Richardson, G. N. et al., "Geosynthetic Design Guidance for Hazardous Waste Landfill Cells and Surface Impoundments", U. S. Environmental Protection Agency, Cincinnati, Ohio, pp. EPA.III-1 to 29.
"Double Liner Application Guide", Gundle Lining Systems, Inc., Houston, Tex.
"Tensar TM Drainage Nets Increase Your Capacity", The Tensar Corporation, Morrow, Ga.
"Poly-Flex TM Polyethylene Geomembranes", Poly-America, Inc., Grand Prairie, Tex.
Mark, H. F. et al., *Encyclopedia of Polymer Science and Engineering*, vol. 1, John Wiley & Sons, N.Y., 1985, pp. 3–8.
*Geotechnical Fabrics Report*, (Dec. 1989), pp. 5, 60, 61.

*Primary Examiner*—David H. Corbin
*Attorney, Agent, or Firm*—William R. Sharp

[57] ABSTRACT

A layered geosystem and method employ at least one layer of geotextile which has at least one surface friction-treated with a treatment material in a manner described herein. Contact of the friction-treated surface with an adjacent layer of, for example, geonet or geomembrane assists in preventing movement of such a layer which can occur on sloped terrain.

30 Claims, 2 Drawing Sheets

LAYERED GEOSYSTEM AND METHOD

BACKGROUND OF THE INVENTION

This invention relates to a geosystem of the type which includes a plurality of layers, and which when prepared for use is positioned upon and in contact with the earth. According to another aspect, the invention relates to a method of forming such a layered geosystem.

In response to recently implemented environmental regulations, geosystems are now widely used on polluted areas of terrain as protective barriers to prevent contamination of ground water or nearby waterways. Such a geosystem can be used either to line containment cells or to cap a polluted, filled area.

In the case of a containment cell, which is essentially an excavated cavity in the earth, a geosystem is positioned at the bottom of the cell in contact with the earth. Such a containment cell can be used as, for example, a landfill as a depository for garbage or as a waste pond or canal in which various industrial waste products can be deposited. The geosystem in such a containment cell functions to prevent contaminated fluids, sometimes referred to as "leachate", from penetrating into ground water deposits or nearby waterways.

Where a geosystem is used as a cap, a polluted (i.e. garbage) area of terrain is covered with soil, which is then topped with the geosystem. The geosystem functions to prevent rain water from reaching the contaminated ground, so as to prevent percolation of water through the contaminated ground and to surrounding ground water deposits or nearby waterways.

Geosystems can include a substantially impervious membrane ("geomembrane") layer made of a plastic, for example, and typically also include additional layers such as fabric ("geotextile") and/or permeable net material ("geonet"). Geonet is placed above a geomembrane, and functions as a drainage layer in conducting a flow of contaminated fluids to a suitable collection system (i.e. a pipe network). Geotextile is used in geosystems for a variety of reasons. For example, a geotextile can be used as a separation layer between different layers of the geosystem or between a layer and soil, as a "cushion" or protective layer to protect other layers from damage due to rocks or other sharp objects, or as a drainage layer to conduct contaminated fluids therethrough due to the "wicking" action of the geotextile.

It is particularly desirable in the design of containment cells and filled in, capped areas to maximize slope of sidewalls of such containment cells and capped areas. This serves to maximize the volume available for storage of polluted materials for a given surface area of terrain, thus maximizing the cost effective use of available space.

Therefore, it would be desirable to provide an improved geosystem which is particularly adaptable to use on sloped areas of terrain.

SUMMARY OF THE INVENTION

It is, therefore, an object of the invention to provide an improved geosystem as described above.

According to one aspect of the invention, there is provided a layered geosystem positioned upon and in contact with the earth which comprises: a treated fabric layer which comprises a fabric having at least one surface which is friction-treated with a treatment material; and at least one additional layer which is positioned so as to be in contact with the friction-treated surface. As will be discussed further in the Detailed Description of the Invention, the term "friction-treated", as that term is applied to a surface, means that such a surface has associated therewith a higher coefficient of friction than the surface in the untreated condition.

According to another aspect of the invention, there is provided a method of forming a layered geosystem, which comprises the steps of: providing a treated fabric layer which comprises a fabric having at least one surface which is friction-treated with a treatment material; providing at least one additional layer; and positioning the treated fabric layer and the additional layer(s) to form the layered geosystem such that the thus formed geosystem lies upon and in contact with the earth and such that the additional layer(s) contacts the friction-treated surface(s) of the fabric.

According to preferred embodiments of the invention, the fabric employed can comprise nonwoven synthetic fibers, and the treatment material can comprise, according to certain aspects of the invention, any suitable coefficient of friction enhancing material such as natural rubber, a polymer of an acrylate, a styrene-diene copolymer, a polymer of vinyl acetate, or mixtures thereof. The above-mentioned additional layer(s) in contact with the treated fabric layer can comprise, for example, membrane and/or net layers, as is further discussed below.

It has been found that layers of substantially impervious membrane ("geomembrane") or permeable net material ("geonet") in contact with a conventional, untreated fabric ("geotextile") or with each other on sloping terrain tend to slip during installation and/or long term usage, thereby causing high, potentially damaging seam stresses and general instability of the system. Such slippage can also cause damage if the slipping layer is in contact with rocks or other sharp objects. Providing a treatment material on a surface of the geotextile and positioning the thus treated geotextile in contact with a geomembrane or geonet in accordance with the invention effectively prevents such slippage. Therefore, a geosystem employing a geotextile in accordance with invention can be utilized effectively on steep slopes in the range of, for example, about 10° to about 60° with respect to the horizontal without any associated slippage of the various layers and consequent damage thereto.

DETAILED DESCRIPTION OF THE DRAWINGS

Embodiments of the invention will now be described with response to the FIGURES. It should be understood that these FIGURES are schematic representations which are provided for a better understanding of the invention and are not necessarily drawn to scale. Furthermore, although the invention will be described in terms of its use in a containment cell, it should be understood that the invention is equally applicable to a filled in, capped area wherein the invention is advantageous in its use on sloped sidewalls of such a capped area.

Figure 1:
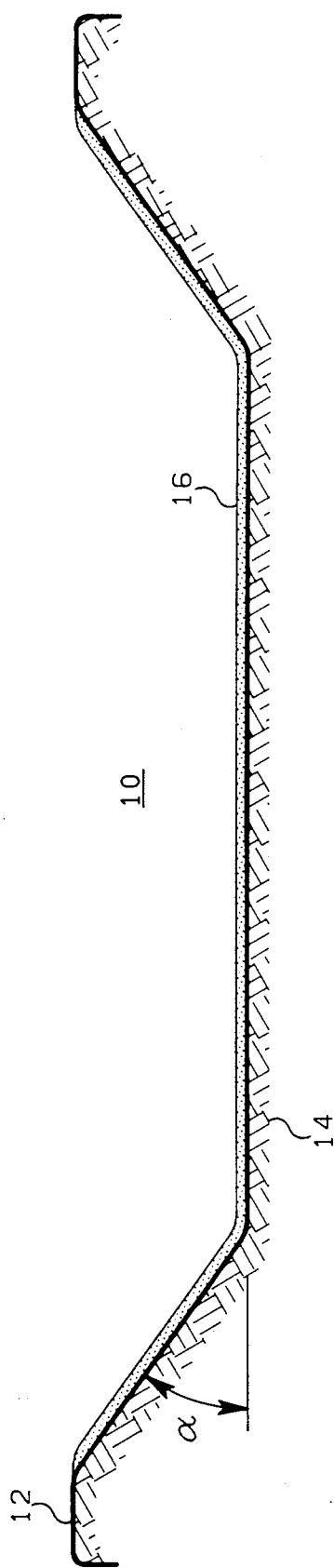
FIG. 1 is a schematic cross-sectional view of a containment cell having a geosystem positioned therein.

Referring now to FIG. 1, there is shown a containment cell 10 having a geosystem 12 therein. As shown, geosystem 12 lies upon and in contact with the earth. A layer of soil 14 lying directly underneath geosystem 12 is preferably compacted to reduce its permeability in case the system develops any punctures. As a further safeguard, it is most preferable that soil layer 14 have a high clay content to further reduce its permeability.

Figure 2:
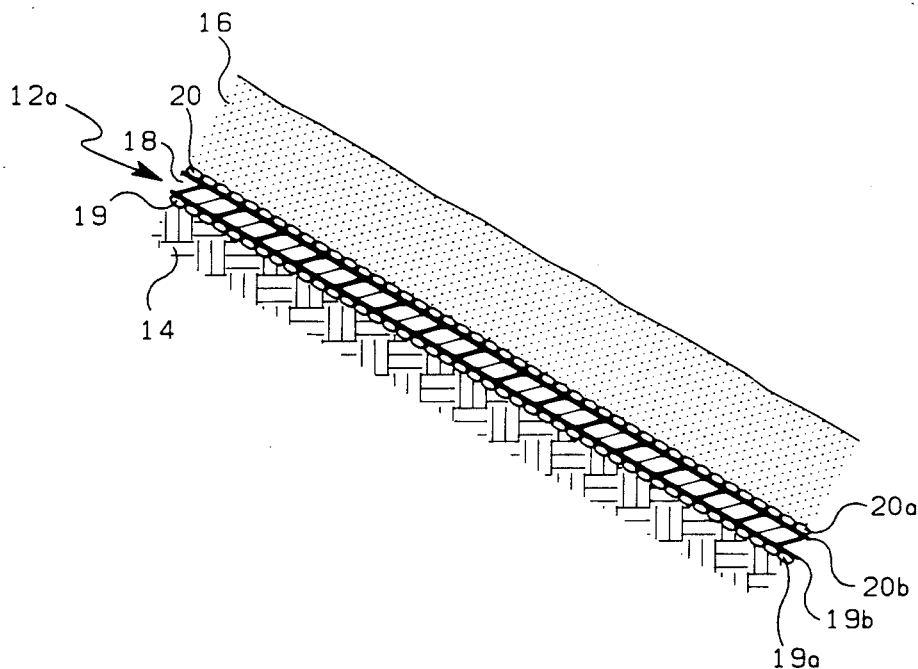
FIGS. 2 and 3 are close-up cross-sectional views of two different respective embodiments of a layered geosystem in accordance with the invention.
Figure 3:
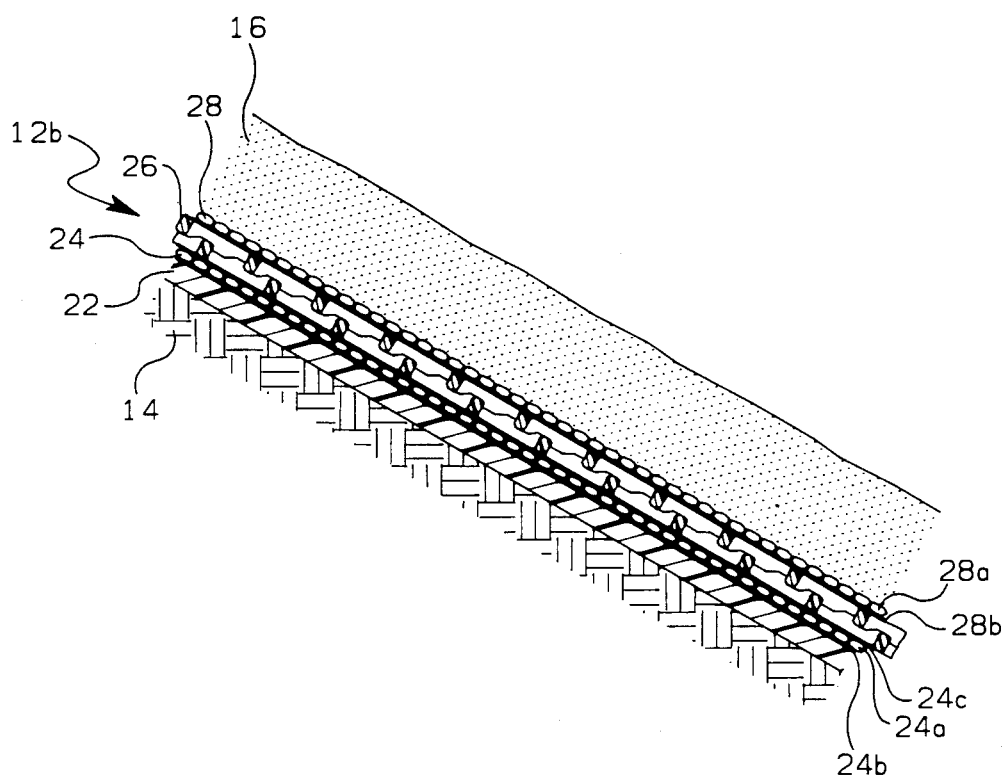

Geosystem 12, schematically illustrated in FIG. 1 as a single bold line, actually includes a plurality of layers as will be further discussed with reference to FIGS. 2 and 3. Such layers are positioned within containment cell 10 in a manner well known to those skilled in the art by unrolling flexible sheets from rolls and placing such sheets to form a desired geosystem as shown in FIGS. 2 and 3, for example. Seams between sheets are typically secured by tack welding or other suitable techniques. The integrity of such seams is particularly important in effective long term usage of the geosystem. As will become more apparent below, a geosystem in accordance with the invention assists in preventing undue stress on such seams, thus enhancing the integrity of such seams and the system in general.

Where containment cell 10 is to used as a landfill, for example, a layer 16 of coarse sand or fine gravel, typically about 1 or 2 feet thick, is provided over geosystem 12. Layer 16 acts as a natural drainage layer by receiving contaminated fluids which drain to a suitable collection system, such as a pipe network (not shown).

It can be seen that the containment cell 10 has sloped sidewalls. The portions of geosystem 12 which line such sidewalls define an acute angle, depicted as $\alpha$ in FIG. 1, with respect to the horizontal. Angle $\alpha$ is typically at least about 10°, and as shown in subsequent examples, a layered geosystem in accordance with the invention can be sloped with respect to the horizontal at an angle of up to about 60° without any slippage of layers of the system. Of course, the sidewalls of a geosystem in the environment of a sand or gravel filled containment cell as in FIG. 1 can be sloped only to the extent that such sand or gravel will stay in position on the slope.

Reference to FIGS. 2 and 3 will now be made to describe specific embodiments of the invention. Although FIGS. 2 and 3 show only portions of geosystem 12 along a sloped sidewall of containment cell 10, it should be understood that the illustrated cross sections continue along the bottom of containment cell 10. In addition, the embodiments of the invention as described below employ layers of membrane material, net material, and fabric which in the following description are referred to as "geomembrane", "geonet", and "geotextile" respectively since these terms are generally used by those skilled in the art of layered geosystems.

Referring to FIG. 2, this embodiment of layered geosystem 12, indicated at 12a, is a relatively simple system comprising only three layers. The intermediate layer is a substantially impervious geomembrane 18 composed of a flexible plastic material such as polyethylene, polyvinyl chloride (PVC), ethylene-propylene diene terpolymer (EPDM), or chlorinated polyethylene alloy (CPE-A). Such geomembrane material is commercially available in various thicknesses in the range of about 20 to about 100 mils. The bottom and top layers are treated geotextiles 19 and 20, respectively, which serve to protect geomembrane 18 from being damaged by rocks or other sharp objects during installation and/or long term use. Treated geotextile 19 comprises a geotextile 19a having an upper surface 19b which is friction-treated with a treatment material and which is in contact with the lower surface of geomembrane 18. Treated geotextile 20 comprises a geotextile 20a having a lower surface 20b which is friction-treated with a treatment material and which is in contact with the upper surface of geomembrane 18. The friction-treated surfaces are indicated by heavy shading. It should be understood that such shading is merely a schematic representation of the treatment material on the geotextile surfaces, and is not meant to imply that the treatment material necessarily completely covers all of the fibers of such geotextile surfaces. The treatment material may or may not completely cover its corresponding geotextile surface depending on the amount of treatment material applied and the permeability of the geotextile to the treatment material.

The term "friction-treated" as that term is applied to a geotextile surface and as used herein and in the appended claims means that such a friction-treated geotextile surface has a higher coefficient of static friction, with respect to another surface in contact with the friction-treated geotextile surface, than the geotextile surface in the untreated condition. The "coefficient of static friction" with respect to a surface of an object and an inclined supporting surface underlying and contacting the object surface can be defined as the tangent of the angle, defined by the inclined supporting surface with respect to the horizontal, at which sliding of the object relative to the inclined supporting surface begins. It should be apparent that since a surface of a geotextile which is friction-treated with a solid treatment material in accordance with the invention is merely in contact with but "not bound to" (as that term is used herein and in the appended claims) an adjacent layer, inclining such contacting layers to some maximum inclination with respect to the horizontal will result in sliding of the layers with respect to each other.

With respect to a friction-treated geotextile surface, the treatment material preferably has a weight of about 1% to about 15%, most preferably about 5% to about 10%, of the weight of the untreated geotextile, and preferably comprises a suitable coefficient of friction enhancing material such as natural rubber, a polymer of an acrylate, a styrene-diene copolymer, a polymer of vinyl acetate, or mixtures thereof. The acrylic polymer can be a polymer of, for example, an alkyl acrylate such as ethyl or methyl acrylate and if in the form of a copolymer or terpolymer preferably comprises at least about 50 wt. % acrylate monomer. The styrene-diene copolymer can be, for example, a block copolymer such as styrene-butadiene or styrene-isoprene preferably comprising about 25 to about 40 wt. % styrene. A particularly preferred polymer of vinyl acetate is ethylene-vinyl acetate copolymer, preferably comprising at least about 20 wt. % vinyl acetate. All of the above-mentioned weight percentages with respect to various polymers provide desirable elastomeric or "rubber-like" properties.

Friction-treated surfaces 19b and 20b effectively prevent shifting and movement of geomembrane 18 which can occur on slopes, thereby enhancing stability of the system and preventing damage from seam stresses.

Either geotextile 19a or 20a can be any suitable woven or nonwoven fabric which can comprise, for example, synthetic fibers of polypropylene, polyester, polyethylene or polyamide. A particularly preferred geotextile for use with the present invention is a nonwoven fabric of staple polypropylene fibers sold under the product name Supac ® by Phillips Fibers Corporation of Greenville, S.C. Supac ® is available in different weights per square yard ranging from 2 oz./sq. yd. to 18 oz./sq. yd. Each ounce per square yard corresponds to about 10 mils thickness.

Referring to FIG. 3, another embodiment of the geosystem is indicated at 12b which does not include a bottom geotextile layer but includes other additional layers. Geosystem 12b includes the following layers from bottom to top: a substantially impervious geomembrane 22; a first treated geotextile 24; a geonet 26; and a second treated geotextile 28. Treated geotextile 24, which serves a separation function in acting as a separation layer between geomembrane 22 and geonet 26, comprises a geotextile 24a having a friction-treated lower surface 24b and a friction-treated upper surface 24c. As shown, friction-treated lower surface 24b is in contact with the upper surface of geomembrane 22 whereas friction-treated upper surface 24c is in contact with the lower side of geonet 26. Geonet 26 is a permeable net-like material, preferably composed of a flexible plastic such as polyethylene, which allows drainage of contaminated fluids within its structure. The structure of geonet 26 comprises crisscrossing upper and lower sets of elongated plastic members. This supplements the drainage function of sand or gravel layer 16. Treated geotextile 28 comprises a geotextile 28a having a friction-treated lower surface 28b which contacts the upper side of geonet 26. Treated geotextile 28 separates sand or gravel layer 16 from geonet 26 so as to prevent clogging of geonet 26 with sand or gravel from layer 16.

It should be apparent from FIG. 3 that friction-treated surfaces 24b, 24c, and 28b will function to prevent movement and separation of the various layers of geosystem 12b.

Of course, although only two embodiments of a geosystem in accordance with the invention have been illustrated and described, it should be apparent to one skilled in the art that many variations of these embodiments are within the scope of certain aspects of the invention. For example, additional layers of geomembranes and/or geonets could be provided, along with associated treated geotextile layers. In addition, other types of layers, not discussed above, could be provided in contact with a treated geotextile, such as a perforated, plastic reinforcing layer called a "geogrid".

A treatment material can be applied to a surface of a geotextile in any convenient form. It is presently preferred to apply either dispersions or hot melt compositions to the geotextile.

A dispersion to be applied to a geotextile is preferably an aqueous dispersion characterized by a coefficient of friction enhancing component dispersed in water. This component can be, for example, natural rubber, a polymer of an acrylate, a styrene-diene copolymer, or mixtures thereof. These materials have been more particularly discussed previously. Preferably, the dispersion comprises about 30 to about 60 wt. % of the above-mentioned component, no more than about 10 wt. % auxiliary components such as anionic or nonionic emulsifiers, buffers, initiators, etc. used in the polymerization reaction, and the remainder water. Emulsifiers are generally present in the amount of about 0.5 to about 2 wt. %. All weight percentages given above and elsewhere in this application are based on total weight of the composition.

Although the term "dispersion" is used above and elsewhere herein since it is characterized by solids dispersed in an aqueous medium, it should be understood that the term "emulsion" is sometimes used by those skilled in the art in view of "emulsifiers" being contained therein.

The dispersion can be applied to the surface of the geotextile by, for example, spraying or roll transfer. With respect to spraying, the dispersion can be sprayed at room temperature as an atomized mist or as larger droplets or beads. With respect to roll transfer, a roll can be rotated in the dispersion and the geotextile passed over the roll so as to transfer dispersion from the roll to the geotextile.

Whatever technique is used to apply the dispersion to the geotextile, it is preferable that the geotextile be subsequently subjected to a drying procedure in order to evaporate water from the geotextile. Such a drying procedure typically involves allowing the geotextile to dry in an oven at a temperature less than the melting temperature of the geotextile fibers for about 1 to about 3 minutes. Typical drying temperatures for a polypropylene geotextile are in the range of about 250° F. to about 300° F.

As mentioned previously, the treatment material can also be applied in the form of a hot melt composition. As used herein, the term "hot melt composition" is understood to mean a composition which is solid at room temperature but which can be heated so as to be applicable to a surface in liquid form. A hot melt composition used in accordance with the invention is preferably characterized by about 10 to about 50 wt. % of a suitable previously discussed polymer such as a polymer of vinyl acetate, a styrene-diene copolymer, or mixtures thereof, and can be further characterized by various additives, such as, for example, about 0 to about 70 wt. % parafinic or napthanic waxes and/or oils, and about 0 to about 70 wt. % tackifying and/or surface-wetting resins.

To apply the hot melt composition, it should be heated to a temperature above the melting point of the composition but below a temperature which would cause melting of the geotextile fibers. The temperature to which the hot melt composition is heated depends to some extent on the resulting viscosity desired and the application technique employed. In the case of polypropylene geotextile fibers, it is typical to heat the hot melt composition to a temperature of about 350° F. to about 400° F. The temperature of the hot melt composition will generally decrease to below the melting point of the fibers when exposed to the atmosphere at room temperature before actually contacting the geotextile. Suitable application techniques include spraying, roll transfer and extrusion. In extrusion, the hot melt composition is extruded through a nozzle in a relatively viscous state and applied in a continuous stream onto the geotextile. Excess hot melt composition can be scraped off of the geotextile.

The hot melt composition quickly solidifies on the surface of the geotextile after being applied. It should be noted in particular that no drying of the geotextile is required as is the case with dispersions. Therefore, application of the finished treatment material typically requires less time than dispersions and additionally omits the expense of a drying oven.

Another possible type of composition which could be applied to the geotextile is a solvent-based composition. Such a composition would be applied in a liquid but highly viscous state which would solidify on the surface of the geotextile after a period of tiem when the solvent evaporates.

EXAMPLES

Examples will now be described to further illustrate the invention. These examples should not be construed to limit the invention in any manner.

EXAMPLE I

The purpose of this example is to demonstrate the effectiveness of a treated geotextile, in accordance with the invention, in preventing slippage between the treated geotextile and a geomembrane on relatively steep slopes.

Two runs were carried out wherein the following procedure was followed in each run. A sheet of Supac® 8NP (8 ounces per square yard nonwoven polypropylene geotextile (available from Phillips Fibers Corporation as noted previously) was treated by means of the roll transfer technique previously described with an aqueous, natural rubber dispersion available under the product name F-9543 (PFN) from Textile Chemical & Rubber Co. of Dalton, Ga., followed by drying of the treated geotextile in an oven at a temperature of about 250° F. for a time of about 2 minutes. The treated geotextile was then attached to a 30 inch×30 inch plywood sheet. A sheet of 60 mil high density polyethylene geomembrane (available from Gundle Lining Systems of Houston, Tex.) was attached to a 12 inch×12 inch plywood block, and the block was placed on top of the geotextile such that the geomembrane was in contact with the treated side of the geotextile. The geotextile was positioned at increasing angles with respect to the horizontal to determine the maximum angle at which the geomembrane would not slide for a minimum of 2 hours. Table I sets forth this maximum angle for each run, along with the treatment material weight percentage and the side of the geotextile which was treated. The treatment material weight percentage as given in Table I is the weight of the treatment material on the treated geotextile (after drying) in terms of percentage of the weight of the untreated geotextile. This was determined simply by weighing the geotextile before being treated and also after treating and drying. The difference in such determined weights gave the total weight of the treatment material. With respect to the treated side of the geotextile, the Supac geotextile has a smooth, heat-set "fused" side and a fuzzy, "beard" non-heat-set side.

TABLE I

| Run | Treatment Material Wt. % | Treated Side | Maximum Angle (degrees) |
|---|---|---|---|
| 1 | 5.3 | Fused | 23 |
| 2 | 6.0 | Beard | 45 |

The procedure employed in this example is substantially similar to that described in Example I, except an aqueous acrylic dispersion was sprayed onto the geotextile. The acrylic dispersion of this example is sold under the product name Acrylic 774 by Para-Chem of Simpsonville, S.C. Table II sets forth data and results for runs 3 and 4.

TABLE II

| Run | Treatment Material Wt. % | Treated Side | Maximum Angle (degrees) |
|---|---|---|---|
| 3 | 5.0 | Beard | 24 |
| 4 | 8.0 | Beard | 27 |

EXAMPLE III

The procedure employed in this example was substantially similar to that described in Example I, except that an aqueous styrene-butadiene dispersion was sprayed onto the geotextile. Runs 5–12 were carried out using several different styrene-butadiene dispersion products sold under the following product designations by Valchem Polymers of Langley, S.C.: 386-235 (runs 5 and 6); #28 (runs 7 and 8); 87-804-110 (runs 9 and 10); and #35 (runs 11 and 12). Data and results corresponding to runs 5–12 are set forth in Table III.

TABLE III

| Run | Treatment Material Wt. % | Treated Side | Maximum Angle (degrees) |
|---|---|---|---|
| 5 | 3.0 | Beard | 40 |
| 6 | 5.0 | Beard | 47 |
| 7 | 3.0 | Beard | 44 |
| 8 | 5.0 | Beard | 49 |
| 9 | 3.0 | Beard | 34 |
| 10 | 5.0 | Beard | 42 |
| 11 | 3.0 | Beard | 38 |
| 12 | 5.0 | Beard | 47 |

EXAMPLE IV

The procedure employed in this example is substantially similar to that described in Example I, except that an aqueous dispersion based on an elastomeric, fully saturated, acrylic terpolymer was sprayed onto the geotextile. The dispersion of this example, sold under the product name HyStretch® Latex V-60 by B.F. Goodrich Company, Chemical Group of Cleveland, Ohio, contains a synthetic anionic surfactant system, and is further characterized by particle sizes of about 0.28 microns and a specific gravity of about 1.011. Although the commercially available product normally contains about 51 wt. % solids, the product was further diluted with water in the runs of this example to reduce the weight percentage of solids. The dispersions of runs 13 and 14 contained about 25 wt. % solids, whereas the dispersions of runs 15 and 16 contained only about 10 wt. % solids. Data and results for runs 13–16 are set forth in Table IV.

TABLE IV

| Run | Treatment Material Wt. % | Treated Side | Maximum Angle (degrees) |
|---|---|---|---|
| 13 | 8.0 | Beard | 43 |
| 14 | 8.0 | Fused | 40 |
| 15 | 1.0 | Beard | 37 |
| 16 | 1.0 | Beard | 24 |

EXAMPLE V

The procedure employed in this example is substantially similar to that described in Example I, except that a hot melt composition was applied to the geotextile by either spraying or by roll transfer after having been melted at a temperature of about 400° F. Of course, no drying step was necessary in this example as is necessary when using a dispersion. The hot melt composition of this example, sold under the product name Reynco 502-30 by The Reynolds Company of Greenville, S.C., is based on a styrenic block polymer, and further includes as additives a parafinic oil, methyl styrene, and a C-5 hydrocarbon tackifying resin. Runs 17-33 were carried out using this hot melt composition. Data and results for these runs are set forth in Table V.

TABLE V

| Run | Treatment Material Wt. % | Treated Side | Maximum Angle (degrees) |
|---|---|---|---|
| 17 | 12.6 | Beard | 30 |
| 18 | 11.0 | Beard | 43 |
| 19 | 4.8 | Beard | 32 |
| 20 | 7.0 | Beard | 40 |
| 21 | 6.7 | Fused | 35 |
| 22 | 4.4 | Beard | 32 |
| 23 | 8.6 | Beard | 43 |
| 24 | 7.7 | Beard | 37 |
| 25 | 10.0 | Beard | 36 |
| 26 | 7.5 | Fused | 47 |
| 27 | 4.7 | Fused | 45 |
| 28 | 7.2 | Beard | 50 |
| 29 | 10.7 | Beard | 52 |
| 30 | 7.8 | Beard | 50 |
| 31 | 12.6 | Beard | 54 |
| 32 | 7.3 | Beard | 57 |
| 33 | 6.6 | Fused | 58 |

EXAMPLE VI

The purpose of this example is to demonstrate the effectiveness of the invention in a field test.

The beard side of a sheet of Supac ® 8NP geotextile was treated with the natural rubber dispersion of Example I in substantially the same manner as in Example I. This treated geotextile was placed, treated side up, on a section of terrain sloped at an angle with respect to the horizontal of about 19°. A sheet of 20 mil high density polyethylene geomembrane (available from Gundle Lining Systems) was then placed on top of the treated geotextile so as to contact the treated side of the geotextile. The geomembrane held without slippage. As a control, the same test was carried out using an untreated sheet of Supac ® 8NP geotextile instead of the treated geotextile. The geomembrane would not hold on the untreated geotextile so as to slip down the slope, thus illustrating the effectiveness of the invention.

The same tests as described above were repeated on a 27° slope with the same results.

EXAMPLE VII

The purpose of this example is to further illustrate the effectiveness of the invention in field tests.

A sheet of Supac ® 4NP geotextile was treated on both sides with a natural rubber dispersion using the same dispersion and treating technique employed in Example VI. This treated geotextile was positioned over a sheet of 20 mil geomembrane (same material as in Example VI) and under a sheet of ¼ inch thick high density polyethylene geonet (available from Gundle Lining Systems, Inc.). This formed a three layer system which was placed on a 19° slope such that the geomembrane bottom layer was in contact with the earth. This entire layered system held without slippage. In a control test on the same 19° slope using an untreated geotextile, the layered system immediately separated due to slippage. Also, the geonet slipped immediately when placed directly on the geomembrane at the same 19° slope.

The same tests as described above were repeated on a 27° slope with the same results.

That which is claimed is:

1. A layered geosystem positioned upon and in contact with the earth which comprises:
   a treated fabric layer which comprises a fabric having at least one surface which is friction-treated with a treatment material comprising a material selected from the group consisting of natural rubber, a polymer of an acrylate, a styrene-diene copolymer, a polymer of vinyl acetate, and mixtures thereof;
   at least one additional layer which is positioned so as to be in contact with said at least one surface.

2. A layered geosystem as recited in claim 1 wherein at least a portion of said geosystem is sloped so as to define an acute angle with respect to the horizontal.

3. A layered geosystem as recited in claim 2 wherein said acute angle is in the range of about 10° to about 60°.

4. A layered geosystem as recited in claim 1 wherein said fabric comprises nonwoven synthetic fibers.

5. A layered geosystem as recited in claim 4 wherein said fibers comprise a polymer selected from the group consisting of polypropylene, polyester, polyethylene, and polyamide.

6. A layered geosystem as recited in claim 5 wherein said polymer is polypropylene.

7. A layered geosystem as recited in claim 6 wherein said fibers are staple fibers.

8. A layered geosystem as recited in claim 7 wherein said treatment material has a weight which is in the range of about 1% to about 15% of the weight of said fabric in the untreated condition.

9. A layered geosystem as recited in claim 8 wherein said weight range is about 5% to about 10%.

10. A layered geosystem as recited in claim 1 wherein said at least one additional layer comprises a substantially impervious membrane layer having a surface thereof in contact with said at least one friction-treated surface of said fabric.

11. A layered geosystem as recited in claim 1 wherein said at least one additional layer comprises a permeable net layer having a side thereof in contact with said at least one friction-treated surface of said fabric.

12. A layered geosystem as recited in claim 1 wherein said fabric has first and second opposing friction-treated surfaces, and wherein said at least one layer comprises: a substantially impervious membrane layer having a surface thereof in contact with said first friction-treated surface of said fabric; and a permeable net layer having a first side thereof in contact with said second friction-treated surface of said fabric.

13. A layered geosystem as recited in claim 12 wherein said net layer has a second side opposite said first side, said geosystem further comprising a second treated fabric layer comprising a fabric having a friction-treated surface which is in contact with said second side of said net layer.

14. A layered geosystem as recited in claim 13 wherein each of said membrane layer and said net layer comprise a flexible plastic material.

15. A layered geosystem as recited in claim 14 wherein said flexible plastic material is polyethylene.

16. A method of forming a layered geosystem which comprises the steps of:
   (a) providing a treated fabric layer which comprises a fabric having at least one surface which is friction-treated with a treatment material comprising a material selected from the group consisting of natural rubber, a polymer of an acrylate, a styrene-diene copolymer, a polymer of vinyl acetate, and mixtures thereof;

(b) providing at least one additional layer;

(c) positioning said treated fabric layer and said at least one additional layer to form the layered geosystem such that the thus formed layered geosystem lies upon and in contact with the earth and such that said at least one additional layer contacts said at least one friction-treated surface of said fabric.

17. A method as recited in claim 16 wherein said geosystem is positioned such that at least a portion thereof is sloped so as to define an acute angle with respect to the horizontal.

18. A method as recited in claim 17 wherein said acute angle is in the range of about 10° to about 60°.

19. A method as recited in claim 16 wherein said fabric comprises nonwoven synthetic fibers.

20. A method as recited in claim 19 wherein said fibers comprise a polymer selected from the group consisting of polypropylene, polyester, polyethylene, and polyamide.

21. A method as recited in claim 20 wherein said polymer is polypropylene.

22. A method as recited in claim 21 wherein said fibers are staple fibers.

23. A method as recited in claim 22 wherein said treatment material has a weight which is in the range of about 1% to about 15% of the weight of said fabric in the untreated condition.

24. A method as recited in claim 23 wherein said weight range is about 5% to about 10%.

25. A method as recited in claim 16 wherein said at least one additional layer comprises a substantially impervious membrane layer having a surface thereof which is positioned in step (c) so as to contact said at least one friction-treated surface of said fabric.

26. A method as recited in claim 16 wherein said at least one additional layer comprises a permeable net layer having a side thereof which is positioned in step (c) so as to contact said at least one friction-treated surface of said fabric.

27. A method as recited in claim 16 wherein said fabric has first and second opposing friction-treated surfaces, and wherein said at least one additional layer comprises a substantially impervious membrane layer having a surface thereof which is positioned in step (c) so as to contact said first friction-treated surface of said fabric, said at least one additional layer further comprising a permeable net layer having a first side thereof which is positioned in step (c) so as to contact said second friction-treated surface of said fabric.

28. A method as recited in claim 27 wherein said net layer has a second side opposite said first side, said method further comprising positioning a second treated fabric layer, which comprises a fabric having a friction-treated surface, such that said friction-treated surface of said second treated fabric layer is in contact said second side of said net.

29. A method as recited in claim 28 wherein each of said membrane layer and said net layer comprise a flexible plastic material.

30. A method as recited in claim 29 wherein said flexible plastic material is polyethylene.

* * * * *